United States Patent [19]
Hedtke

[11] Patent Number: 5,095,739
[45] Date of Patent: Mar. 17, 1992

[54] TANK LEAK DETECTOR

[75] Inventor: Robert C. Hedtke, Hamburg, Minn.

[73] Assignee: Rosemount Inc., Eden Prairie, Minn.

[21] Appl. No.: 565,044

[22] Filed: Aug. 9, 1990

[51] Int. Cl.$^5$ ............................................. G01M 3/32
[52] U.S. Cl. ...................................... 73/49.2; 73/302
[58] Field of Search ................ 73/49.2, 299, 302, 301

[56] References Cited

U.S. PATENT DOCUMENTS

| | | | |
|---|---|---|---|
| 3,023,619 | 3/1962 | Sandford | 73/299 |
| 3,049,921 | 8/1962 | Shiver | 73/302 |
| 3,537,298 | 11/1970 | Kapff | 73/49.2 |
| 3,538,746 | 11/1970 | Jacobs et al. | 73/49.2 |
| 3,580,055 | 5/1971 | White | 73/49.2 |
| 3,800,586 | 4/1974 | Delatorre et al. | 73/49.2 |
| 4,638,662 | 1/1987 | Watson | 73/302 |
| 4,646,560 | 3/1987 | Maresca, Jr. et al. | 73/49.2 |
| 4,649,739 | 3/1987 | Horner | 83/49.2 |
| 4,675,834 | 6/1987 | Furuse | 364/558 |
| 4,732,035 | 3/1988 | Lagergren et al. | 73/49.2 |
| 4,736,622 | 4/1988 | Miller et al. | 73/49.2 |
| 4,739,648 | 4/1988 | Horner | 73/49.2 |

FOREIGN PATENT DOCUMENTS 2638199 3/1977 Fed. Rep. of Germany ....... 73/49.2

Primary Examiner—Hezron E. Williams
Assistant Examiner—Joseph W. Roskos
Attorney, Agent, or Firm—Kinney & Lange

[57] ABSTRACT

A tank leak detector has a pressure transmitter suspended in a tank to detect liquid level changes of a fluid by sensing a pressure which changes when a liquid level changes. The transmitter preferably is a differential pressure transmitter. A pump is provided for drawing liquid through a tube up to a sealed passageway in a manifold which is connected to a pressure sensing inlet of the pressure transmitter. The pump eliminates air bubbles in the passageway and at the pressure sensing inlet. The sealed passageway provides a liquid column that changes in pressure at the pressure sensing inlet as the liquid level rises and falls where transmitter output indicates liquid level changes. The detector is temperature stable because the tank is underground where both inlets of a pressure sensor are at the same temperature. The unit is easily installed in existing tanks by suspending from a support in the tank.

14 Claims, 2 Drawing Sheets

TANK LEAK DETECTOR

BACKGROUND OF THE INVENTION

The present invention relates to a tank leak detector that utilizes a precision pressure transmitter positioned in a tank. The detector precisely indicates leaks into the tank and leaks out of the tank, including evaporation loss. The detector is preferably designed for operation in underground tanks, especially previously installed tanks, where temperature stability of measurements is very good. The detector can also be operated outside the tank or as part of an automatic system that keeps the fluid in the tank at a particular level.

Various tank level detectors or leak detectors have been utilized in the past, some of which use pressure sensors immersed in the liquid to detect changes in pressure heads of columns of liquid in a tank relative to a reference during a monitoring or test time, such as taught in U.S. Pat. No. 4,739,648 to Horner. The drawback to this type of detector is that the detector must be immersed in the liquid, preventing monitoring of low levels of fluid. Other devices use a bubbling technique, such as taught in U.S. Pat. No. 4,649,739 to Horner, in which a continuous stream of bubbles of air is forced into the liquid near the bottom of the tank and the resistance to air introduction used as an indication of level of the liquid in the tank.

There is a need to provide a detector capable of operation both above and below the liquid surface. Further, there is a need to provide a detector that can reside entirely within a previously installed tank without having to dig up the tank or drain the fluid to put holes in a tank wall.

SUMMARY OF THE INVENTION

The present invention relates to a tank leak detector that utilizes a pressure transmitter having an output representing changes in a liquid level in a tank. A first inlet of the pressure transmitter connects to and senses pressure at a first port of a manifold, the manifold in turn having a second port connecting to a tube which extends below the surface of the liquid. A third port of the manifold connects to a device for drawing liquid from the tank up through the tube into the manifold via the second port, where the second and third ports each connect to the first port via a sealed passageway. After closing off flow of the liquid to the manifold, changes in the transmitter output represent changes of the liquid level.

Any suitable self-priming pump, such as a diaphragm, gear or piston type pump, can be used for drawing the liquid into the manifold through the tube that is inserted in the liquid to provide a very compact assembly. The pump can be manually operated or electrically activated from a remote location.

The detector can be submerged in the liquid or positioned above the liquid level in the tank, including external to the tank. Because tanks are generally underground, temperature variations are not significant and have little effect on the detector positioned within the tank.

The detector can use, for example, an absolute pressure sensor, or a differential pressure sensor having its low pressure inlet vented to a point above the fluid level in the tank to correct for changes in pressure of the air or vapor at the top of the tank.

DETAILED DESCRIPTION OF THE PREFERRED EMBODIMENTS

Figure 1:
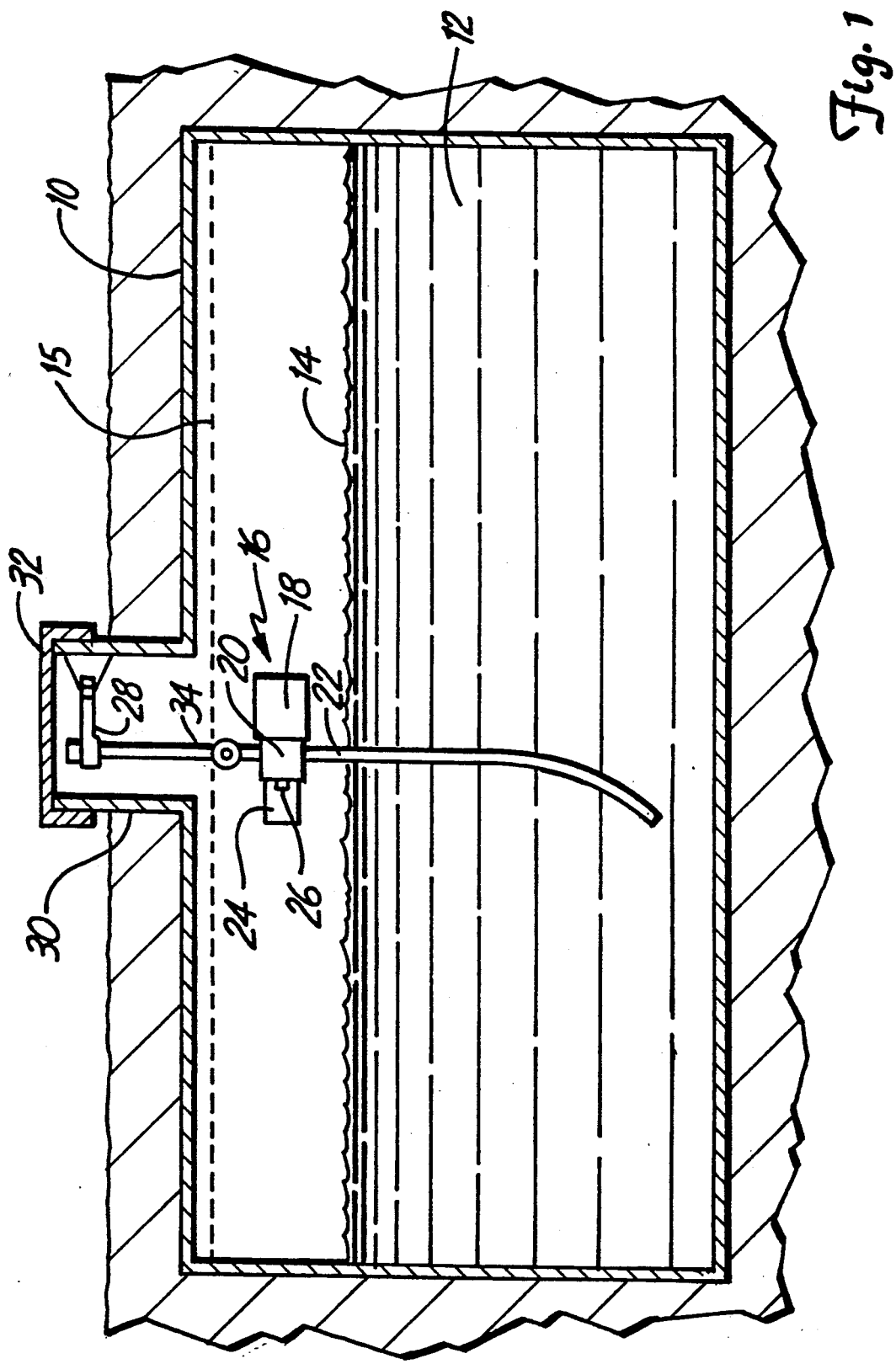
FIG. 1 is a schematic representation of a preferred embodiment of an installation of a transmitter assembly made according to the present invention.

In FIG. 1, an underground storage tank indicated generally at 10, such as a gasoline or an oil tank, is shown containing a liquid 12 having a liquid level 14. A detector made according to the present invention is indicated at 16, comprising a pressure transmitter 18 connecting to a manifold 20, a measurement tube 22 extending from manifold 20 into liquid 12, and a pump assembly 24 connecting to manifold 20 for drawing liquid from tank 10 up into manifold 20 via tube 22, which can then be closed off when pump assembly 24 is not operated. For example, as schematically shown in FIG. 1, a valve 26, which can be manually operated or an automatic check valve, can be used for closing off (sealing) tube 22 and manifold 20 after each has been pumped full of liquid 12.

Support member 28 anchors to a tank neck 30 that leads to an access port 32. A suitable cable or hanger 34, which can be a solid bar for more rigidity, can be used for suspending detector 16 from support member 28.

Figure 2:
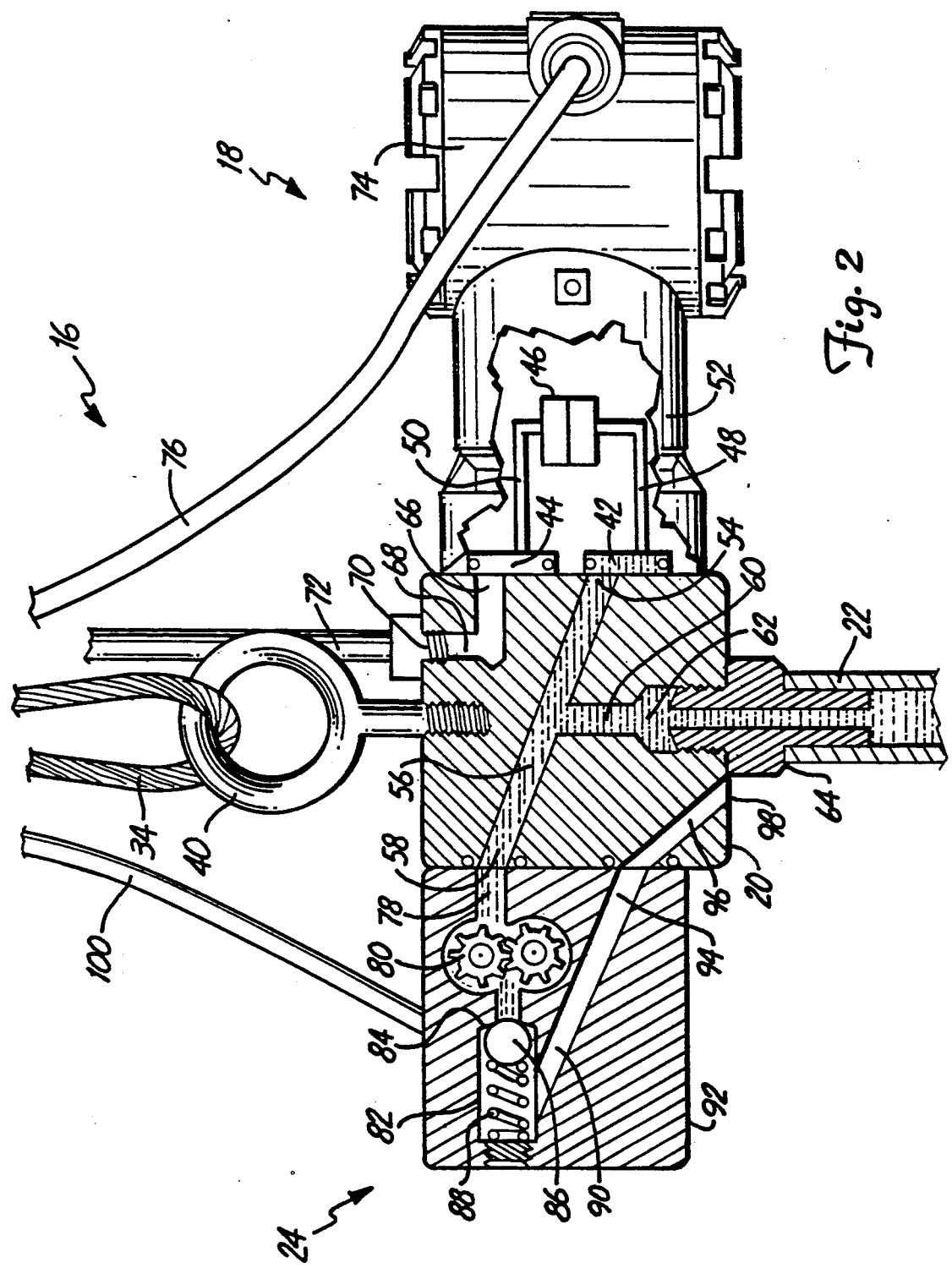
FIG. 2 is a sectional view of the preferred embodiment made according to the present invention.

In FIG. 2, a cross sectional view of detector 16 according to the present invention is shown in greater detail. Cable 34 connects to an eye bolt 40 that connects to fluid manifold 20 for suspending detector 16. The manifold mounts to and supports a pressure transmitter 18 of conventional design, such as Rosemount model 3051C. In the preferred embodiment shown, transmitter 18 is a differential pressure transmitter having a first inlet 42 sensing a variable pressure proportional to liquid level 14, and a second inlet 44 sensing a reference pressure above liquid level 14. Inlets 42 and 44 lead to a differential pressure sensor 46 through suitable passageways 48 and 50, respectively. Differential pressure sensor 46 resides in a sensor housing 52.

Manifold 20 has a first port 54 sealingly coupled to first inlet 42 of transmitter 18. First inlet 42 opens to a passageway 56 which extends upwardly across manifold 20 opening to a third port 58. Passageway 56 sealingly connects to an intersecting passageway 60 which extends downwardly and opening to a second port 62. Second port 62 connects to a conventional fitting 64 which connects to one end of measurement tube 22, as shown in FIG. 2. The other end of tube 22 is submerged in liquid 12 in tank 10. Second inlet 44 of transmitter 18 is sealingly connected to a fourth port 66 in manifold 20. Fourth port 66 connects via passageway 68 formed in manifold 20 to a fifth port 70 which sealingly connects to vent tube 72, that as shown, passes upwardly to atmosphere above liquid level 14. Tube 70 can extend to a point outside tank 10, for example, to correct for changes in air or vapor inside the tank, or when tank 10 is substantially full, as illustrated in FIG. 1 by liquid level 15, to allow detector 16 to be submerged in liquid 12 if desired. A remote end of tube 70 should be looped back downward to reduce condensation buildup in tube 70.

Electronic circuit housing 74 connects to sensor housing 52 and contains transmitter electronics sending a transmitter output signal via cable 76 outside tank 10 representative of liquid level 14 for monitoring. The transmitter output signal, such as a 4-20 mA DC current, is representative of differentials in pressure between first inlet 42 and second inlet 44 of transmitter 18.

A low pressure port 78 of pump assembly 24 sealingly connects to third port 58 of manifold 20. Port 78 opens to a low pressure or suction side of a pump section or gears 80, which, when operating, draws fluid through a ball check valve 82. Ball check valve 82 comprises a valve seat 84, a ball 86, and a load spring 88 made in a conventional manner, as shown in FIG. 2. A drain passageway 90 extends through pump body 92 to a discharge port 94 which sealingly connects to passageway 96 of manifold 20. Passageway 96 opens to outlet 98 of manifold 20 such that fluid pumped by pump assembly 24 discharges out through outlet 98 against an exterior of fitting 64, which connects to tube 22. Discharging liquid drains down along the tube 22 thus reducing the likelihood of splashing, which can generate undesired static electricity in non-conducting flammable fluids which can generate a spark with sufficient energy to ignite an explosive atmosphere.

Pump section 80 can be driven by, for example, a small electric motor included in pump assembly 24 where power is fed through a power cable 100. Cable 100 extends out through access port 32 of tank 10 along with cable 76, and vent tube 72 if desired. Pump assembly 24, when operated, draws liquid up through tube 22 filling passageways 56 and 60 with liquid from tank 10 until a continuous flow of liquid passes check valve 82. Pump assembly 24 then shuts off and check valve ball 86 seats to create a partial vacuum which traps liquid in tube 22 and passageways 56 and 60. The trapped liquid generates a pressure on first inlet 42 of transmitter 18 proportional to distance between first inlet 42 and liquid surface 14.

Valve 82 can reside, for example, between gears 80 and manifold 20, or at discharge port 94. When an automatic check valve is used, it can also serve as part of pump assembly 24, as in the case of a piston pump. In some types of pumps, the pump itself blocks flow when it is shut off, and a separate valve to close off flow is not needed. Passageway 56 in manifold 20, as shown, inclines upwardly from inlet 42 toward pump port 78 so that gravity forces any bubbles to rise to pump port 78, where they can be expelled through check valve 82. Manifold 20 is self priming, where a recess at inlet 42 and passageways 56 and 60 fill with liquid as pump assembly 24 is operated. Manifold 20 can also, for example, be combined with pump assembly 24 to form a single assembly.

Initially, a reference reading is obtained at the beginning of a test period by placing detector assembly 16 in a fixed position by, for example, suspending from support member 28 with cable 34 or placing to rest upon a pedestal in tank 10. The initial transmitter output signal corresponds to a reference liquid level 14 creating a reference differential pressure across first inlet 42 and second inlet 44. Any leakage into or out of tank 10 causing a change in liquid level 14 causes a proportional change in differential pressure across inlets 42 and 44, which is sensed by sensor 46 in transmitter 18 and reflected in a transmitter output transmitted on cable 76 and monitored outside tank 10.

A differential transmitter provides an output signal that is not absolute, but, rather, is relative to the reference reading. The transmitter can only detect differences in pressures corresponding to changes in liquid levels. The output signal is not affected by atmospheric pressure which acts equally upon both inlet 42 and inlet 44 thus cancelling errors. An absolute pressure transmitter instead of a differential pressure transmitter can be used where reference pressure to sensor 46 comprises an internal vacuum rather than the atmosphere vent tube 72 leads to, however, the transmitter output would be dependent on atmospheric pressure. Sensitivity of transmitter 18 can be increased by increasing a time constant for response. The transmitter output is effectively averaged over a larger time period. Temperature stability of the transmitter output is good because both first and second inlets 42 and 44 of transmitter 18 are at the same temperature and tank 10 is generally underground at a fairly uniform temperature.

The length of tube 22 should be limited so that pressure in passageways 56 and 60 is always greater than a vapor pressure of liquid 12 being measured. Should this occur, undesired vapor will form in manifold passageways.

Utilizing a pressure transmitter detector 16 is easily made, easily operated, and very accurate. Although the present invention has been described with reference to preferred embodiments, workers skilled in the art will recognize that changes may be made in form and detail without departing from the spirit and scope of the invention.

What is claimed is:

1. An apparatus generating a pressure transmitter output representing changes in a liquid level in a tank, comprising:
   a pressure transmitter having a first inlet sensing pressure and generating the pressure transmitter output;
   a manifold having a first port sealingly coupled to the first inlet and having second and third ports coupled to the first port via a sealed passageway;
   a tube having a first end sealingly connected to the second port and extending to a second end disposed below the liquid level; and
   means for drawing liquid sealingly coupled to the third port for drawing liquid up the tube and then closing off flow through the third port, such that after closing off the flow, changes in the pressure transmitter output represent changes of the liquid level.

2. The apparatus as specified in claim 1 further comprising means for positioning the manifold inside the tank at a selected elevation with respect to the tank.

3. The apparatus as specified in claim 2 wherein the sealed passageway inclines upwardly from the first inlet toward the third port.

4. The apparatus as specified in claim 3 wherein means for drawing liquid comprises a pump.

5. The apparatus as specified in claim 4 wherein the pressure transmitter comprises a differential pressure sensor having a second inlet sensing ambient air pressure as a reference pressure.

6. The apparatus as specified in claim 5 wherein the transmitter is positioned above the liquid level to be measured.

7. The apparatus as specified in claim 5 wherein the transmitter is submerged in the liquid.

8. The apparatus as specified in claim 5 wherein the tube has a length which ensures that a pressure at the third port is less than a vapor pressure of the liquid in the tube.

9. A detector for detecting changes in a liquid level in a tank, comprising:
- a pressure transmitter having a first inlet sensing pressure and providing an output signal which is a function of pressure at the sensing inlet;
- a housing having a passageway coupled to the pressure sensing inlet;
- a tube having one end sealingly connected to the passageway and having a second end open to liquid below the liquid level; and
- means for drawing liquid to the passageway and for sealing the passageway when filled such that changes of the liquid level are proportional to pressure changes in the passageway.

10. The detector as specified in claim 9 wherein the passageway inclines upwardly from the first inlet toward means for drawing liquid to the passageway.

11. The detector of claim 10, further comprising means for positioning the pressure transmitter at a selected elevation with respect to the tank.

12. The detector as specified in claim 11 wherein means for drawing liquid comprises a pump.

13. The detector as specified in claim 12 further comprising means for sealing the passageway when the pump is not operated for retaining liquid in the tube and passageway.

14. The detector of claim 13 wherein means for sealing the passageway comprises a valve.

* * * * *